(12) United States Patent
Briggs

(10) Patent No.: US 10,518,169 B2
(45) Date of Patent: Dec. 31, 2019

(54) INTERACTIVE ENTERTAINMENT USING A MOBILE DEVICE WITH OBJECT TAGGING AND/OR HYPERLINKING

(71) Applicant: Whitewater West Industries Ltd., Richmond (CA)

(72) Inventor: Rick Alan Briggs, Springfield, IL (US)

(73) Assignee: WHITEWATER WEST INDUSTRIES LTD., Richmond, BC (CA)

( * ) Notice: Subject to any disclaimer, the term of this patent is extended or adjusted under 35 U.S.C. 154(b) by 235 days.

(21) Appl. No.: 15/339,361

(22) Filed: Oct. 31, 2016

(65) Prior Publication Data

US 2017/0043244 A1  Feb. 16, 2017

Related U.S. Application Data

(63) Continuation of application No. 13/269,805, filed on Oct. 10, 2011, now Pat. No. 9,480,913.
(Continued)

(51) Int. Cl.
*A63F 9/24*  (2006.01)
*A63F 13/00*  (2014.01)
(Continued)

(52) U.S. Cl.
CPC .......... *A63F 13/213* (2014.09); *A63F 13/327* (2014.09); *A63F 13/332* (2014.09);
(Continued)

(58) Field of Classification Search
None
See application file for complete search history.

(56) References Cited

U.S. PATENT DOCUMENTS

D330,579 S   10/1992  Briggs
5,194,048 A   3/1993  Briggs
(Continued)

FOREIGN PATENT DOCUMENTS

EP   1158118 A2   11/2001
EP   0850096 B1   3/2003
(Continued)

OTHER PUBLICATIONS http://en.wikipedia.org/wiki/Augmented_reality, Retrieved Mar. 14, 2011, "Augumented reality", 1 Pages.
(Continued)

*Primary Examiner* — Kevin Y Kim
(74) *Attorney, Agent, or Firm* — Buchalter, a professional corp

(57) ABSTRACT

Systems and methods for an interactive game using a multi-functional hand-held personal mobile device, such as a smart phone or entertainment device use the smart phone or other mobile device to find and/or activate various effects and items in the real world, then connect those items and effects together to provide a purpose to finding the effects/items consistent with the game theme. Embodiments include themes related to a treasure hunt with items that may or may not respond to the player detecting or finding them. In other embodiments, the mobile device may trigger and activate multiple layers of videos, phone calls, internet access, texts, voiceovers, puzzles and numerous other actions and results tied into a complex gaming adventure.

24 Claims, 11 Drawing Sheets

Related U.S. Application Data

(60) Provisional application No. 61/468,768, filed on Mar. 29, 2011, provisional application No. 61/436,204, filed on Jan. 26, 2011.

(51) Int. Cl.

| | | |
|---|---|---|
| *G06F 17/00* | (2019.01) | |
| *G06F 19/00* | (2018.01) | |
| *A63F 13/213* | (2014.01) | |
| *A63F 13/42* | (2014.01) | |
| *A63F 13/327* | (2014.01) | |
| *A63F 13/335* | (2014.01) | |
| *A63F 13/332* | (2014.01) | |
| *H04W 4/80* | (2018.01) | |
| *H04L 29/06* | (2006.01) | |
| *G06K 19/06* | (2006.01) | |
| *H04M 1/725* | (2006.01) | |

(52) U.S. Cl.
CPC ............ *A63F 13/335* (2014.09); *A63F 13/42* (2014.09); *G06K 19/06037* (2013.01); *H04L 67/38* (2013.01); *H04M 1/72522* (2013.01); *H04W 4/80* (2018.02); *A63F 2300/405* (2013.01); *A63F 2300/406* (2013.01); *A63F 2300/407* (2013.01)

(56) References Cited

U.S. PATENT DOCUMENTS

| | | |
|---|---|---|
| 5,378,197 A | 1/1995 | Briggs |
| 5,405,294 A | 4/1995 | Briggs |
| 5,470,039 A | 11/1995 | Hilger |
| 5,649,867 A | 7/1997 | Briggs |
| 5,662,525 A | 9/1997 | Briggs |
| D387,583 S | 12/1997 | Shear |
| 5,741,189 A | 4/1998 | Briggs |
| 5,820,471 A | 10/1998 | Briggs |
| 5,820,472 A | 10/1998 | Briggs |
| D403,392 S | 12/1998 | Briggs et al. |
| 5,853,332 A | 12/1998 | Briggs |
| 5,865,680 A | 2/1999 | Briggs |
| D406,871 S | 3/1999 | Briggs |
| D407,133 S | 3/1999 | Briggs |
| 5,906,015 A | 5/1999 | Hilger et al. |
| 5,927,805 A | 7/1999 | Hilger et al. |
| D413,957 S | 9/1999 | Briggs |
| 5,967,901 A | 10/1999 | Briggs |
| D416,066 S | 11/1999 | Briggs |
| 5,987,677 A | 11/1999 | Betker |
| D421,283 S | 2/2000 | Briggs et al. |
| 6,089,987 A | 7/2000 | Briggs |
| 6,132,318 A | 10/2000 | Briggs |
| 6,174,242 B1 | 1/2001 | Briggs et al. |
| 6,186,902 B1 | 2/2001 | Briggs |
| 6,210,287 B1 | 4/2001 | Briggs |
| 6,231,451 B1 | 5/2001 | Briggs |
| 6,264,202 B1 | 7/2001 | Briggs |
| 6,269,503 B1 | 8/2001 | Betker |
| 6,276,353 B1 | 8/2001 | Briggs et al. |
| 6,283,871 B1 | 9/2001 | Briggs |
| 6,375,578 B1 | 4/2002 | Briggs |
| D459,131 S | 6/2002 | Zazenski |
| 6,527,646 B1 | 3/2003 | Briggs |
| 6,569,023 B1 | 5/2003 | Briggs |
| 6,608,563 B2 | 8/2003 | Weston et al. |
| 6,634,949 B1 | 10/2003 | Briggs et al. |
| 6,682,074 B2 | 1/2004 | Weston |
| 6,746,334 B1 | 6/2004 | Barney |
| 6,761,637 B2 | 7/2004 | Weston et al. |
| 6,786,830 B2 | 9/2004 | Briggs et al. |
| 6,796,096 B1 | 9/2004 | Heath |
| 6,796,908 B2 | 9/2004 | Weston |
| 6,967,566 B2 | 11/2005 | Weston et al. |
| 7,029,400 B2 | 4/2006 | Briggs |
| 7,066,781 B2 | 6/2006 | Weston |
| 7,445,550 B2 | 11/2008 | Barney et al. |
| 7,488,231 B2 | 2/2009 | Weston |
| 7,500,917 B2 | 3/2009 | Barney et al. |
| 7,524,246 B2 | 4/2009 | Briggs et al. |
| 7,572,191 B2 | 8/2009 | Weston et al. |
| 7,614,958 B2 | 11/2009 | Weston et al. |
| 7,674,184 B2 | 3/2010 | Briggs et al. |
| 7,749,089 B1 | 7/2010 | Briggs et al. |
| 7,756,757 B1 | 7/2010 | Oakes, III |
| 7,850,527 B2 | 12/2010 | Barney et al. |
| 9,943,768 B2 * | 4/2018 | Izuno ................ A63F 13/95 |
| 2002/0138355 A1 | 9/2002 | Briggs et al. |
| 2002/0175211 A1 | 11/2002 | Dominquez et al. |
| 2004/0014529 A1 | 1/2004 | Briggs et al. |
| 2004/0033833 A1 | 2/2004 | Briggs et al. |
| 2004/0077423 A1 | 4/2004 | Weston et al. |
| 2004/0198517 A1 | 10/2004 | Briggs |
| 2005/0049044 A1 * | 3/2005 | Sato .................. A63F 13/10 463/30 |
| 2005/0059503 A1 | 3/2005 | Briggs et al. |
| 2006/0154726 A1 | 7/2006 | Weston et al. |
| 2006/0229134 A1 | 10/2006 | Briggs et al. |
| 2006/0257471 A1 | 11/2006 | Briggs et al. |
| 2006/0277047 A1 | 12/2006 | Debusk et al. |
| 2006/0287030 A1 | 12/2006 | Briggs et al. |
| 2007/0066396 A1 | 3/2007 | Weston et al. |
| 2007/0249425 A1 | 10/2007 | Weston et al. |
| 2008/0014835 A1 | 1/2008 | Weston et al. |
| 2008/0153694 A1 | 6/2008 | Zheng |
| 2008/0274798 A1 | 11/2008 | Walker et al. |
| 2008/0280676 A1 | 11/2008 | Distanik et al. |
| 2009/0051653 A1 | 2/2009 | Barney et al. |
| 2009/0124165 A1 | 5/2009 | Weston |
| 2009/0156309 A1 | 6/2009 | Weston et al. |
| 2009/0305799 A1 | 12/2009 | Weston et al. |
| 2010/0053164 A1 | 3/2010 | Imai |
| 2010/0056285 A1 | 3/2010 | Weston et al. |
| 2010/0103241 A1 * | 4/2010 | Linaker ............ G06K 9/00979 348/14.02 |
| 2010/0156639 A1 | 6/2010 | Herwig et al. |
| 2010/0158315 A1 * | 6/2010 | Martin ............ G06F 17/30247 382/103 |
| 2010/0203932 A1 | 8/2010 | Briggs et al. |
| 2010/0273556 A1 | 10/2010 | Briggs et al. |
| 2010/0304869 A1 | 12/2010 | Lee et al. |
| 2011/0216002 A1 | 9/2011 | Weising et al. |
| 2011/0246276 A1 | 10/2011 | Peters et al. |

FOREIGN PATENT DOCUMENTS

| | | |
|---|---|---|
| EP | 1606031 B1 | 10/2009 |
| WO | 9629120 A1 | 9/1996 |
| WO | 9706867 A2 | 2/1997 |
| WO | 9828047 A1 | 7/1998 |
| WO | 9836812 A1 | 8/1998 |
| WO | 9850124 A1 | 11/1998 |
| WO | 9932202 A1 | 7/1999 |
| WO | 0061251 A1 | 10/2000 |
| WO | 0062883 A1 | 10/2000 |
| WO | 0154783 A1 | 8/2001 |
| WO | 02058810 A1 | 8/2002 |
| WO | 2004002595 A1 | 1/2004 |
| WO | 2004087271 A1 | 10/2004 |
| WO | 2006039339 A2 | 4/2006 |
| WO | 2006086556 A2 | 8/2006 |
| WO | 2006101880 A2 | 9/2006 |
| WO | 2007058996 A1 | 5/2007 |
| WO | 2007120880 A2 | 10/2007 |

OTHER PUBLICATIONS http://en.wikipedia.org/wiki/Aztec_Code, Retrieved Mar. 14, 2011, "Aztec Code", 3 Pages.
http://newsvote.bbc.co.uk/mpapps/pagetools/print/news.bbc.co.uk/2/hi/technology/817002, Retrieved Mar. 14, 2011, "BBC News: Barcode replacement shown off", by Jonathan Fildes, 2 Pages.

(56) References Cited

OTHER PUBLICATIONS

Mohan et al. "The Future of Barcodes", Optics & Photonics Focus, Jan. 14, 2010, vol. 8, Story 1, 2 Pages.
http://en.wikipedia.org/wiki.bokode, Retrieved Mar. 14, 2011, "Bokode", 1 Page.
http://en.wikipedia.org/wiki/Data_Matrix, Retrieved Mar. 14, 2011, "Data matrix (computer)", 5 Pages.
http://en/wikipedia.org/wiki/Galileo_positioning_system, Retrieved Mar. 14, 2011, "Galileo (satellite navigation)", 1 Page.
http://en.wikipedia.org/wiki/Microsoft_Tag, Retrieved Mar. 14, 2011, "High Capacity Color Barcode", 3 Pages.
http://en.wikipedia.org/wiki/Object_hyperlinking, Retrieved Mar. 14, 2011, "Object hyperlinking", 4 Pages.
http://en.wikipedia.org/wiki/PDF417, Retrieved Mar. 14, 2011, "PDF417", 2 Pages.
http://en.wikipedia.org/wiki/QR_code, Retrieved Mar. 14, 2011, "QR code", 1 Page.
http://en.wikipedia.org/wiki/Semacode, Retrieved Mar. 14, 2011, "Semacode", 2 Pages.
http://en.wikipedia.org/wiki/ShotCode, Retrieved Mar. 14, 2011, "ShotCode", 2 Pages.
http://en.wikipedia.org/SPARQCode, Retrieved Mar. 14, 2011, "SPARQCode", 3 Pages.
http://en.wikipedia.org/wiki/Touchatag, Retrieved Mar. 14, 2011, "Touchatag", 4 Pages.
http://en.wikipedia.org/wiki/Visual_Search_Engine, Retrieved Mar. 14, 2011, "Visual search engine", 1 Page.

\* cited by examiner

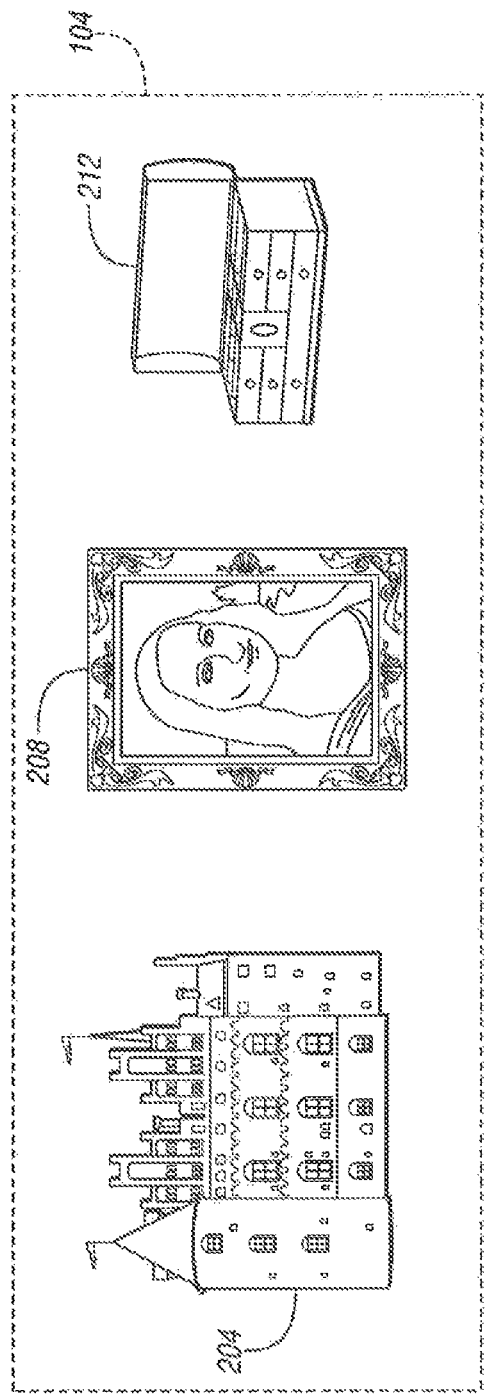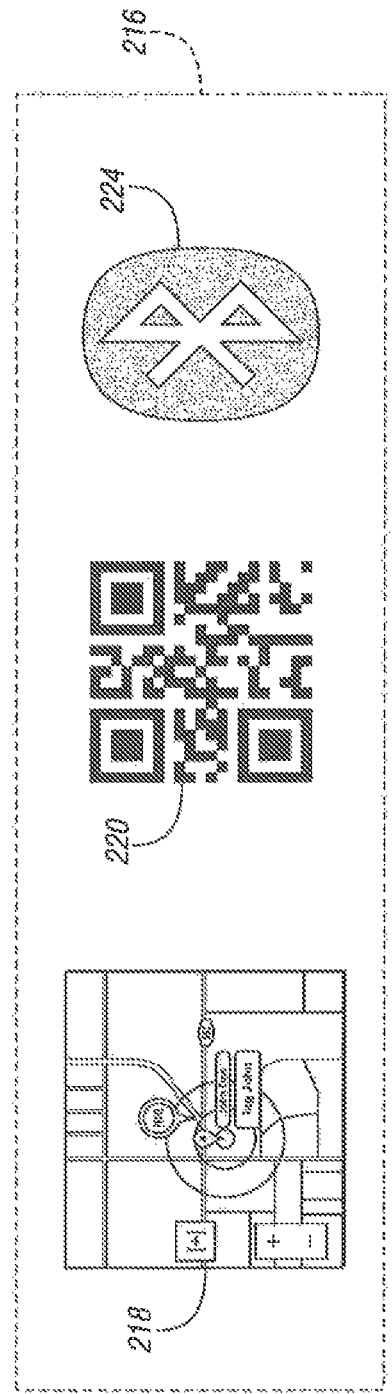
Fig. 2

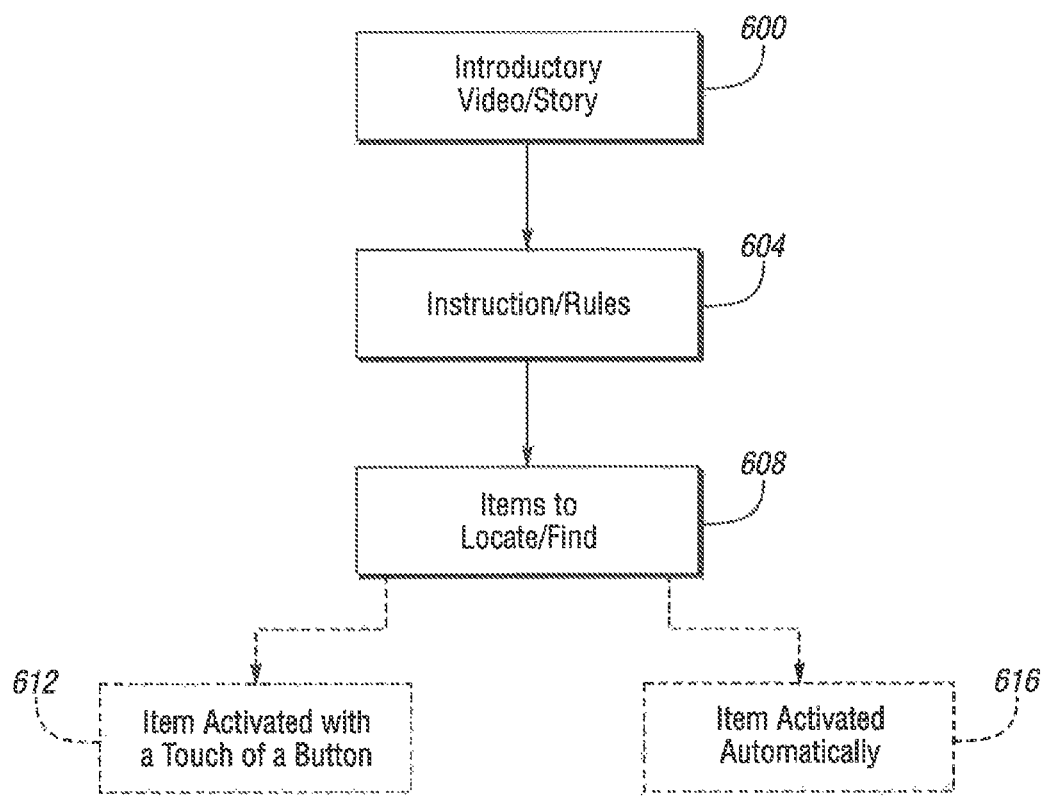

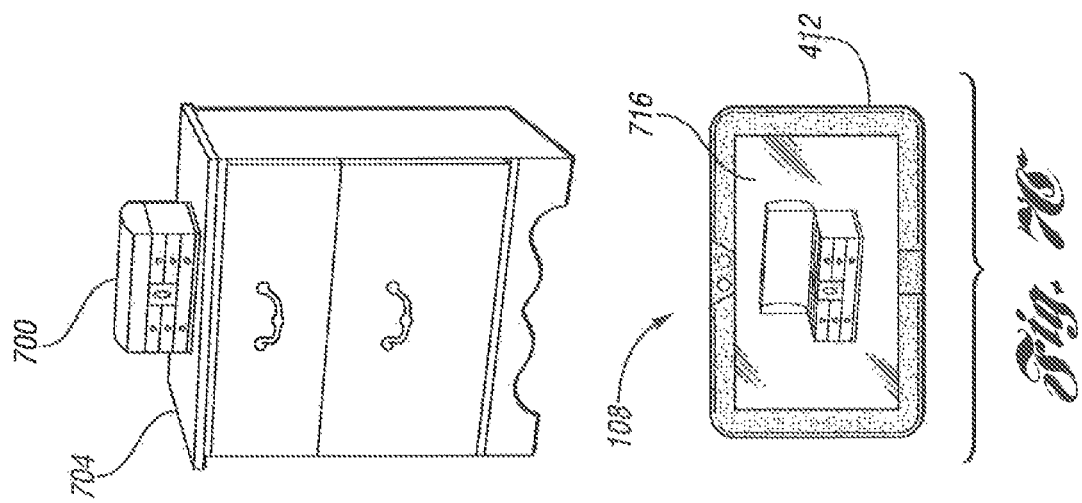
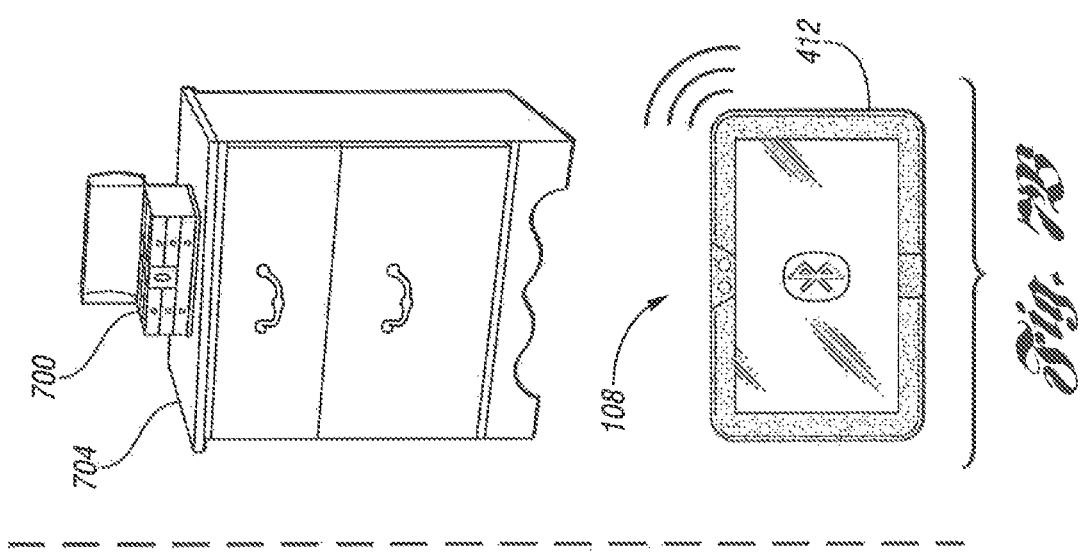
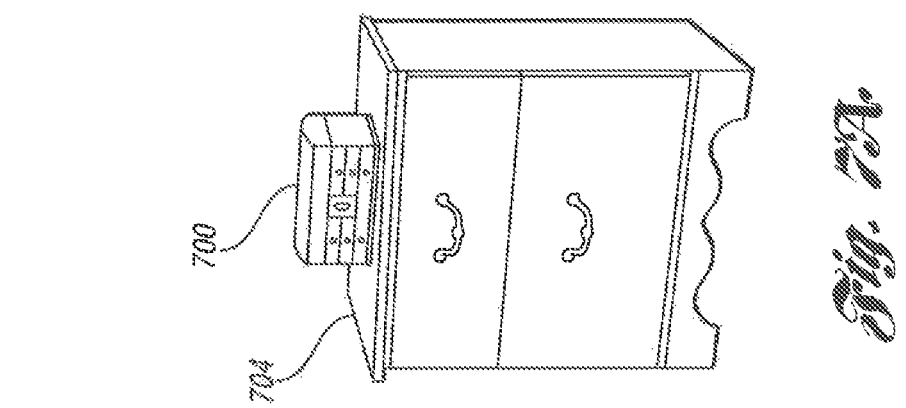

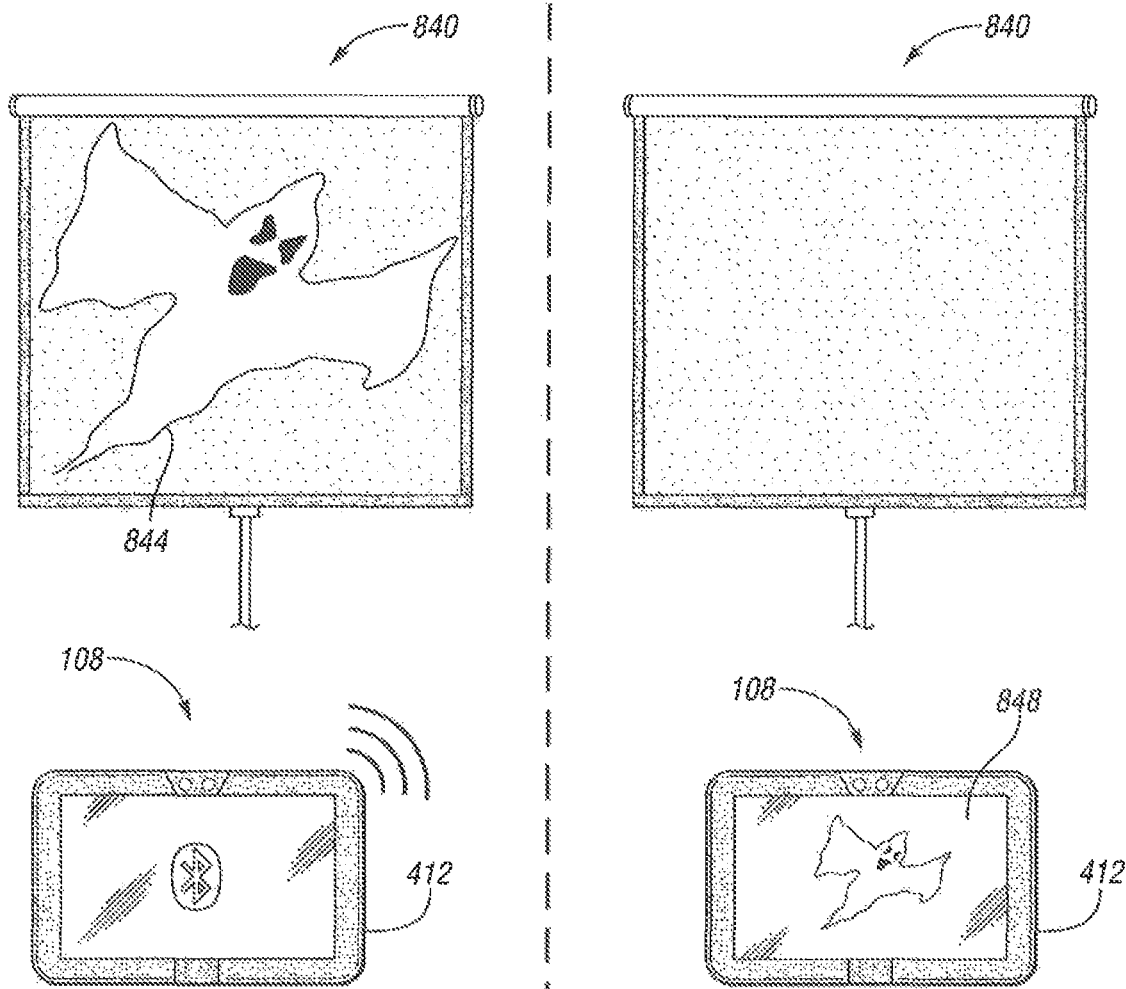

INTERACTIVE ENTERTAINMENT USING A MOBILE DEVICE WITH OBJECT TAGGING AND/OR HYPERLINKING

CROSS-REFERENCE TO RELATED APPLICATIONS

This application is a continuation of U.S. Nonprovisional patent application Ser. No. 13/269,805, filed on Oct. 10, 2011, which claims the benefit of U.S. Provisional Patent Application Ser. Nos. 61/436,204 filed Jan. 26, 2011 and 61/468,768 filed Mar. 29, 2011, the disclosures of which are hereby incorporated by reference in their entirety.

TECHNICAL FIELD

The present disclosure relates to systems and methods for playing an interactive game using a hand-held mobile device, such as a smart phone, tablet computer, or other personal entertainment/communication device, for example.

BACKGROUND

Various interactive adventure games use a hand-held pointing device to activate game features as the player(s) proceed to explore a gaming area. Some of these concepts have been commercialized in a family adventure game known as MagiQuest. The MagiQuest technology uses a custom designed wand as a pointing device in combination with many separate pieces that must all be combined to create the live user experience. For example, the wand uses Infrared (IR) and radio frequency (RF) technology and motion sensing components to activate various special effects, all of which are hard wired back to a central location. In addition, various touch screen monitors may be used to view videos and to receive and end quests. A central server in a remote location controls the game and dispenses the videos to different locations. MagiQuest requires the user to purchase a dedicated, one-of-a-kind device (wand) for a substantial amount of money ($14.95 and up) that has no use other than to play the game. Furthermore, guests also pay separately to play the game after they have purchased the wand. All of these components make the MagiQuest experience very complicated and expensive to build and maintain, with installations costing $1,500,000 and more.

SUMMARY

Systems and methods for an interactive game using a multi-functional hand-held personal mobile device, such as a smart phone, tablet computer, or other mobile entertainment device use the smart phone or other hand-held mobile device to find and/or activate various effects and items in the real world located throughout a designated gaming area, then connect those items and effects together to provide a purpose or goal to finding the effects/items consistent with the game theme. Embodiments include themes related to a treasure hunt with items that may or may not respond to the player detecting or finding them. In other embodiments, the hand-held mobile device may trigger and activate multiple layers of videos, phone calls, internet access, texts, voiceovers, puzzles and numerous other actions and results associated with a more complex gaming adventure.

Various embodiments use object tagging and/or hyperlinking to identify a designated gaming object and trigger an effect. Various types of tagging and tag reading devices may be utilized, which may include active, passive, and combination tags. For example, Radio-Frequency Identification (RFID) tags, graphical tags (including conventional and data matrix type bar codes, quick response (QR) codes, ShotCodes, SPARQCodes, semacodes, Aztec codes, high capacity color barcodes (HCCB), etc.), SMS tags, virtual tags, and the like may be used to identify a gaming object and trigger an effect that may be delivered to, and/or displayed by the hand-held mobile device. Embodiments include the use of mediated reality or augmented reality (AR) to integrate or overlay sensory information with player surroundings when an object is triggered. In one embodiment, the hand-held mobile device is used to capture an image or video of a gaming object or multiple objects within a scene. A visual search engine may be used to process the captured image or video to identify any predetermined gaming object(s) and trigger associated effects or information provided to the user via the hand-held mobile device.

Virtual tagging of an object or location may also be used alone or in combination with one or more audio/visual tags to trigger an associated effect. Virtual tagging may use information based on location of an object, scene, or gaming device/object as determined by GPS or other global navigation satellite systems (such as the Galileo system being deployed in Europe), cellular tower triangulation, Wi-Fi hotspot connections, and the like to identify game player position relative to the object or scene and trigger an associated effect.

Other embodiments leverage available hand-held mobile device resources in combination with other types of entertainment within a family entertainment center to provide a unique user experience that may be adapted to individual visitors by age, interest, device capabilities, etc. For example, in one embodiment, a family entertainment center includes one or more entertainment activities, such as an arcade, mini-golf, go-karts, bumper cars, laser tag, etc. each having associated stations, features, devices, and the like that may communicate with the visitors hand-held mobile device(s) while participating in the activity to provide additional player interaction. Alternatively, or in combination, players may allow direct interaction with other players using their hand-held mobile devices by enabling associated permissions for use within the entertainment center.

Embodiments according to the present disclosure provide various advantages. For example, the mobile device and mobile device game design described herein are based on the live action game being played on a multipurpose, multifunction, hand-held device that the user already owns, such as a smart phone, tablet computer, and/or entertainment device that may or may not have cellular, satellite, Wi-Fi or other wireless communication capabilities. Representative hand-held mobile devices may include a tablet computer such as the Apple iPad, Dell Streak or Inspiron Duo, Samsung Galaxy Tab; smart phones such as the Apple iPhone, Android phones by various manufacturers, Blackberry phones, and the like; and entertainment devices such as the Apple iPod, Nintendo DS, Sony PSP, GP2X etc.

In various embodiments, the entire game itself may be implemented as a mobile device application or app that resides within the hand-held mobile device after it is downloaded and installed by the player using a normal downloading process for apps. In various embodiments, all of the videos for the game play directly on the hand-held mobile device such that no central server is required to monitor player progress to give out rewards, for example. In addition, because interactive gaming according to various embodiments of the present disclosure relies primarily on the hand-held mobile device resources rather than independent servers and numerous dedicated gaming devices, game construction costs may be substantially reduced, such as up to 90%, for example. Distributed resources and development may also be accessed using the internet to integrate information, audio, and/or video from various websites when triggered by an object tag using the hand-held mobile device. Integration of an interactive experience using a hand-held mobile device provided by the player with various forms of traditional entertainment may provide market differentiation to revitalize family entertainment centers and/or provide dedicated hand-held mobile device interactivity centers as a visitor destination. New activities, games, or interactive experiences can be created using a common platform or template to reduce development and deployment costs while providing unique player experiences.

The above advantage and other advantages and features of the present disclosure will be readily apparent from the following detailed description of the preferred embodiments when taken in connection with the accompanying drawings.

BRIEF DESCRIPTION OF THE DRAWINGS

FIG. 2 illustrates representative gaming devices and tags configured to interact with a hand-held mobile device according to various embodiments of the present disclosure;

FIG. 6 is a block diagram illustrating operation of a system or method of interactive gaming according to various embodiments of the present disclosure;

FIGS. 7A-7C illustrate operation of a virtual or augmented reality feature of a system or method for interactive gaming having a jewelry box configured to interact with a hand-held mobile device according to various embodiments of the present invention; and FIGS. 8A-8D illustrate operation of an exemplary embodiment of a system or method for interactive gaming including a haunted house attraction configured to interact with a hand-held mobile device according to various embodiments of the present disclosure.

DETAILED DESCRIPTION

As those of ordinary skill in the art will understand, various features illustrated and/or described with respect to a particular embodiment may be combined with features illustrated and/or described with respect to one or more other embodiments to produce embodiments of the present disclosure that may not be explicitly illustrated or described. The combinations of features explicitly illustrated and/or described provide representative embodiments for typical applications. However, various combinations and modifications of the features consistent with the teachings of the present disclosure may be desired for particular applications or implementations.

The features of the systems and methods will now be described with reference to the drawings summarized above. Throughout the drawings, reference numbers may be re-used to indicate correspondence between referenced elements.

Figure 1:
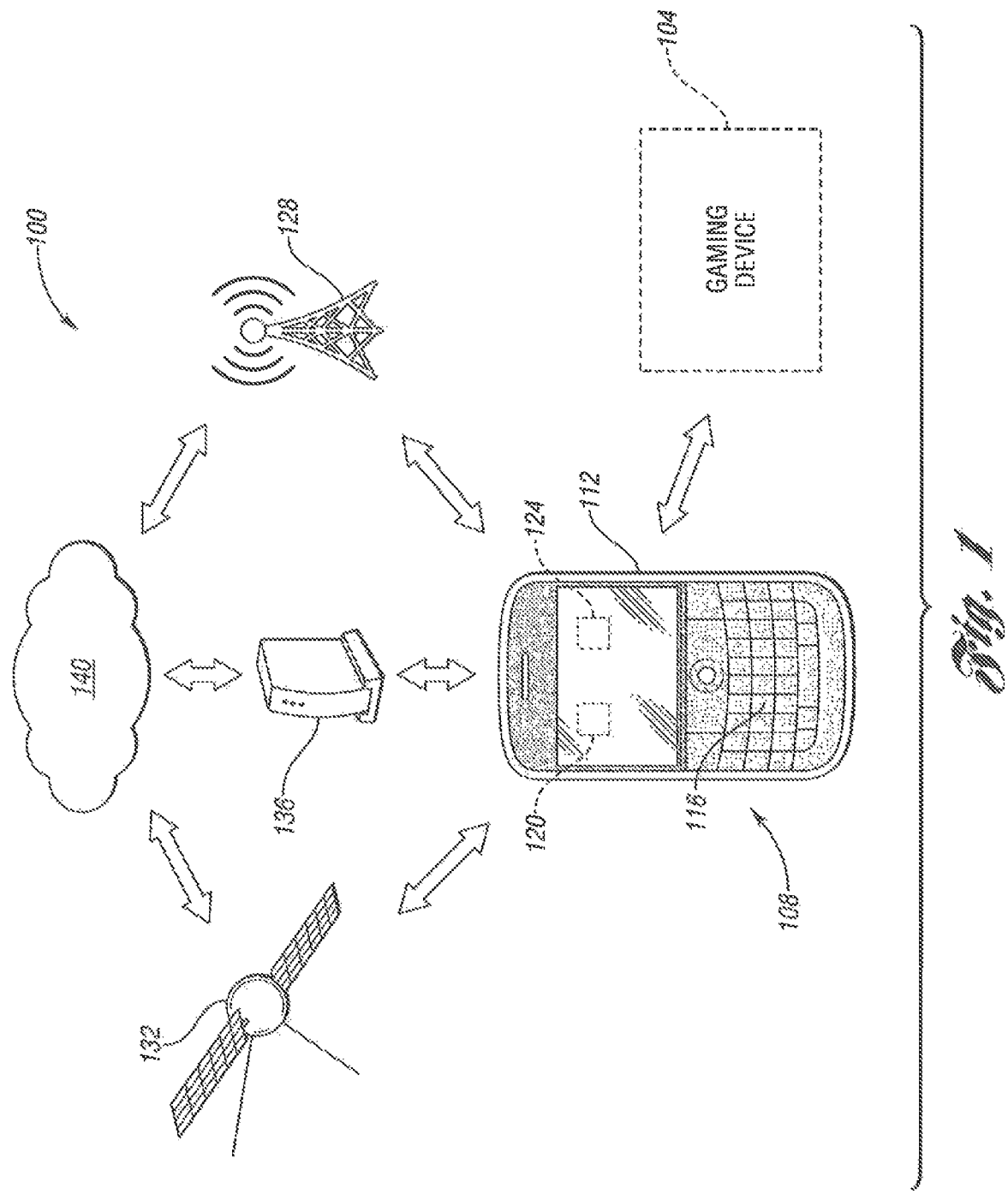
FIG. 1 is a block diagram illustrating operation of a system or method for interactive entertainment using a mobile device with object tagging according to various embodiments of the present disclosure.

FIG. 1 is a block diagram illustrating a representative gaming operating environment including a network operating environment 100 where various communications capabilities of a hand-held mobile device 108, implemented here by a smartphone 112, may be used to communicate with various gaming devices 104 located throughout a designated gaming area. Various resources of the hand-held mobile device 108 may include an input device 116, such as a keyboard, touch screen, soft keys, and the like. Device 108 may include a processor 120 in communication with a memory storage system 124, which permits communication over one or more wired and/or wireless networks. For example, hand-held mobile device 108 may communicate with a cellular tower 128, satellite network 132 and/or WiFi network 136 to access the internet 140 and download gaming information including gaming applications or apps. For example, in one embodiment, each hand-held mobile device 108 may be selectively or temporarily paired with one or more designated gaming devices 104 located throughout the gaming area so that the hand-held mobile device 108 may use the Bluetooth and/or Wi-Fi communications protocol to communicate with and/or activate various active gaming devices 104 located within a designated range of the mobile device 108 within the gaming environment. For example, touching an icon on the screen of the hand-held mobile device 108 will cause a box's lid to open, a light to turn on, or a TV/video monitor to play an associated video.

The gaming objects or devices 104 may be programmed to activate automatically when the device is within range. For example, a Bluetooth enabled device may be automatically paired with a designated gaming device 104 based on the pairing code and/or password provided to the hand-held mobile device 108 by the user or within the gaming application when the gaming application is installed. Similarly, a Wi-Fi enabled mobile device 108 may automatically connect to gaming device 104 or an associated network of gaming devices 104 when device 108 is within range.

One or more available resources of hand-held mobile device 108 may be used to determine user location and activate an associated gaming device 104 or acknowledge that the player has accomplished a goal. For example, hand-held mobile devices 108 having cellular communications capabilities may use triangulation or other strategies to determine user location relative to cellular towers. Similarly, hand-held mobile devices 108 equipped with GPS or other satellite navigation positioning capabilities may use the GPS position coordinates to determine player position relative to one or more game locations or devices 104. Various other information that may be obtained from a cellular tower 128 or satellite network 132, such as altitude information, timestamp, area code, location associated with an IP address, etc. may be incorporated into the game to provide tasks, goals, or other information or data for the player and to determine when the task or goal has been completed such that the player advances through the game. The particular resources used in any particular game may vary depending on the capabilities of the hand-held mobile device 108, gaming devices 104, and/or the size of the gaming area, for example.

As shown in FIG. 2, the gaming area can include one or more gaming devices 104, such as a picture or graphical representation of a scene 204, a portrait 208, and/or a jewelry box 212 that can be paired with one or more tags 216 that allow for activation of the gaming device(s) 104. Tags may include various types of active and/or passive devices. For example, active tags 216 may periodically broadcast identifying information or a beacon that can be received by one or more mobile devices 108 within a particular gaming area. Alternatively, active devices may broadcast information only in response to a polling request or query received from a mobile device 108. Passive tags 216 may be implemented by single or multi-dimensional labels, codes etc.

Tags 216 can include, but are not limited to, a Bluetooth communications device 224, physical tags 220 and/or virtual tags 218. In one embodiment, one or more designated gaming objects and/or devices 104 may be identified by active or passive physical tags 220 or virtual tags. Physical tags 220 may include any of a number of linear or matrix data codes that include patterns to encode information about the object and/or location of the object. Physical tags 220 may be implemented by QR codes, datamatrix, semacodes, SPARQCodes, barcodes, ShotCodes, High Capacity Color Barcodes (HCCB), Aztec codes, and the like. Passive tags do not emit or broadcast their information and generally do not require a power source. Similar coding strategies may also be implemented in active tags, such as bokode or bocode tags, which are a type of light-emitting diode that are generally much smaller than a conventional linear or matrix barcode, such as about 3 mm in diameter, for example, Bokode (permanently coded) and bocode (rewritable) tags may provide different information from different angles based on the imaging effects of the integrated LED lens. Bokode and bocode devices may also be implemented by passive (reflective) devices, Virtual tags 218 may be implemented by associating a URL with a set of geographical coordinates. When a hand-held mobile device 108 is within a predetermined range and/or distance of a gaming device 104, the hand-held mobile device 108 may retrieve all URLs associated with a designated gaming area, for example.

Figure 3:
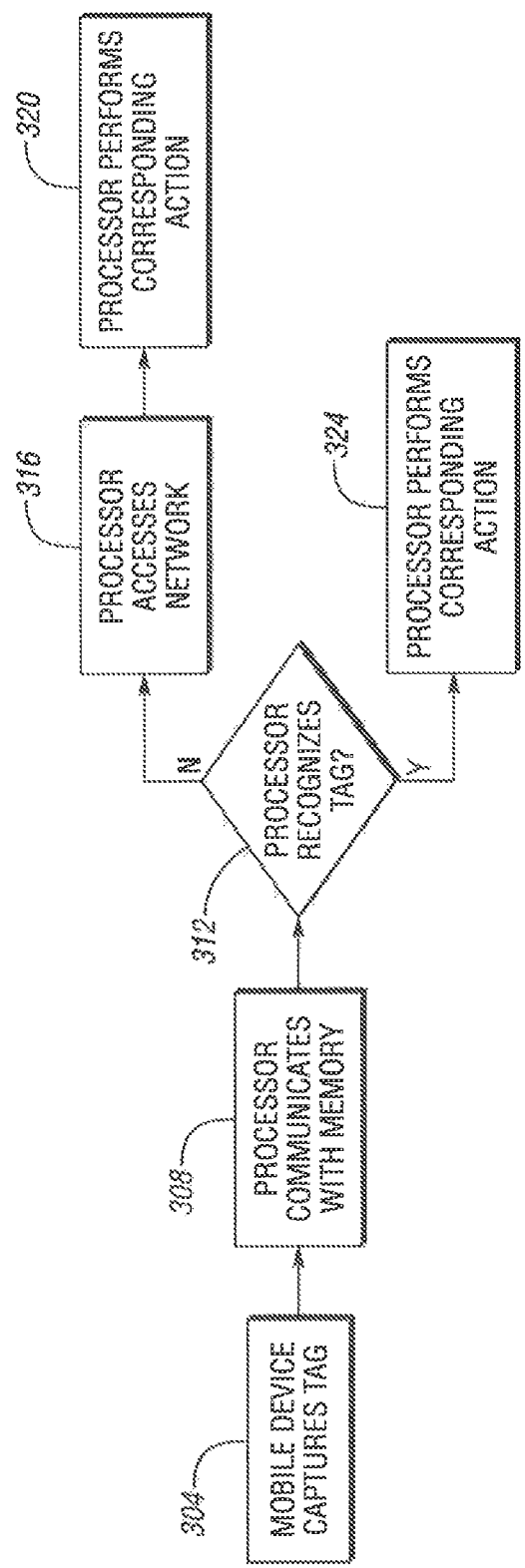
FIG. 3 is a block diagram illustrating operation of a system or method for interactive gaming according to various embodiments of the present disclosure.

Referring now to FIGS. 1-3, operation of a representative system or method for interactive gaming using a mobile device with object tagging will be described with respect to various embodiments according to the present disclosure. In this representative embodiment, an integrated camera on the hand-held mobile device 108 captures an image or video within the gaming environment that includes one or more tags 216 associated with gaming devices 104 as generally represented by block 304. The captured image or video is then processed to identify the location and/or objects and trigger one or more associated effects. Specifically, the processor communicates with an associated local and/or remote memory storage system as represented by block 308. The storage system may include data and instructions executable by the processor. The processor may use various strategies to decode, search, identify, or otherwise recognize or retrieve information associated with a particular tag using local or networked resources. If the processor recognizes the tag as represented by block 312, the processor may perform a corresponding action as represented by block 324. However, if the processor fails to recognize the tag or is otherwise unable to obtain the data or information associated with the tag locally, the processor will attempt to communicate with a cellular, satellite and/or WiFi network to obtain associated information, which may include accessing the internet as represented by block 316. Of course, even if tag information is locally available, the processor may access one or more remote/networked locations to determine if any additional information or updated information is available. The processor may then perform a corresponding action 320 based on information associated with the tag, which may include locally stored information in addition to information received from the internet, for example. The triggered effects and/or corresponding actions may include wirelessly accessing the internet to obtain audio/video or other information presented to the user via the hand-held mobile device 108 or displaying audio/video previously downloaded on the hand-held mobile device 108, for example.

Figure 4:
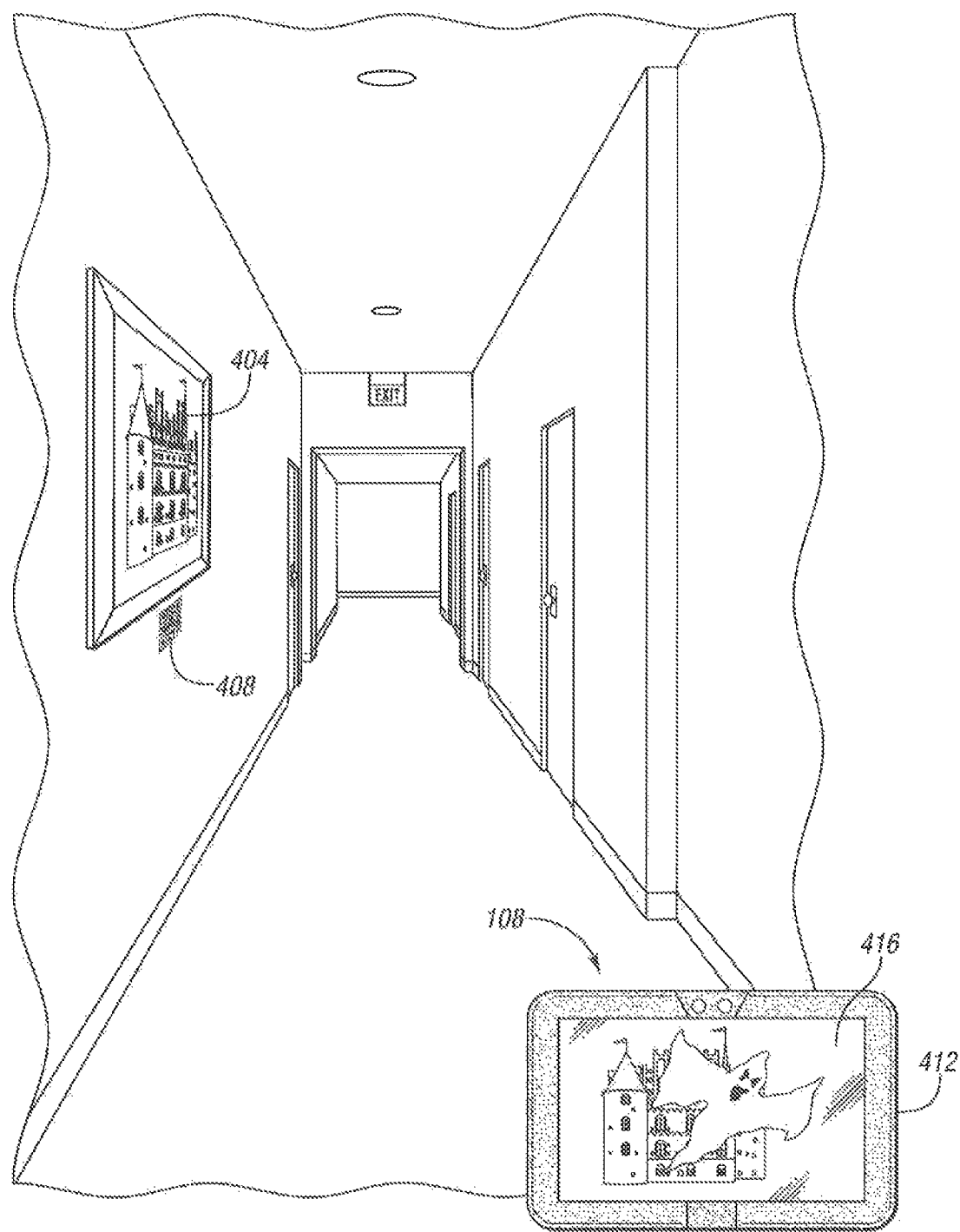
FIG. 4 illustrates a representative gaming environment of an interactive gaming system or method using a hand-held mobile device according to various embodiments of the present disclosure.

FIG. 4 illustrates, in one embodiment, a mediated reality or augmented reality effect that is provided by integrating video and/or other information captured by one or more sensors (such as a camera, GPS, keyboard, etc.) of the hand-held mobile device 108, implemented here by a tablet computer 412, with animation, video, or other information associated with the object or scene. For example, the user captures an image of a hotel hallway 400 having a painting 404 hanging on the wall. The painting 404 may include a physical tag 408, such as a QR code, within the picture, on the frame or on the wall, for example. The QR code is processed by the user's hand-held mobile device 108 and triggers an AR video of a ghostly image superimposed on the real-time video view 416 being captured by the integrated camera of the hand-held mobile device 108.

Figure 5:
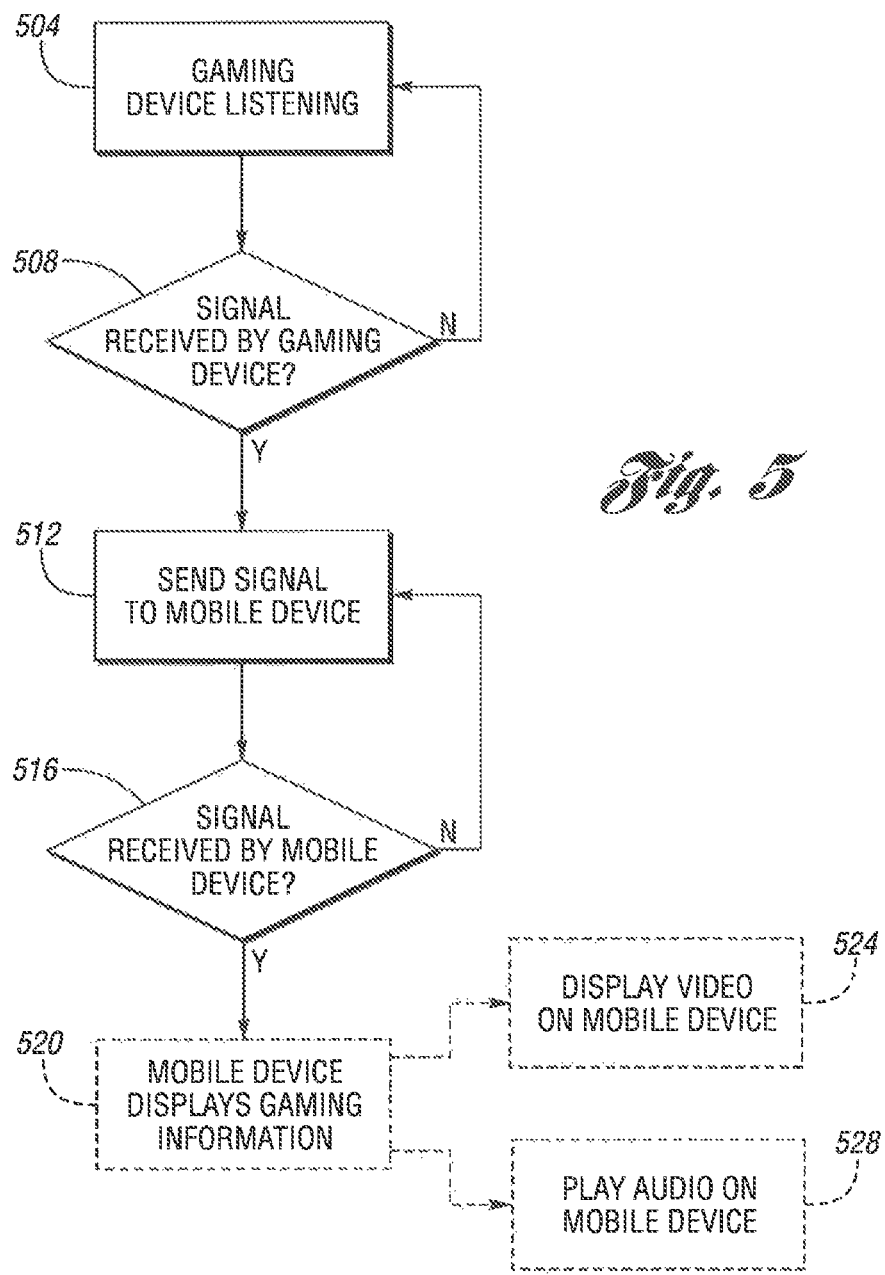
FIG. 5 is a block diagram illustrating operation of a system or method of interactive gaming using a wireless communications protocol according to various embodiments of the present disclosure.
Figure 8A:
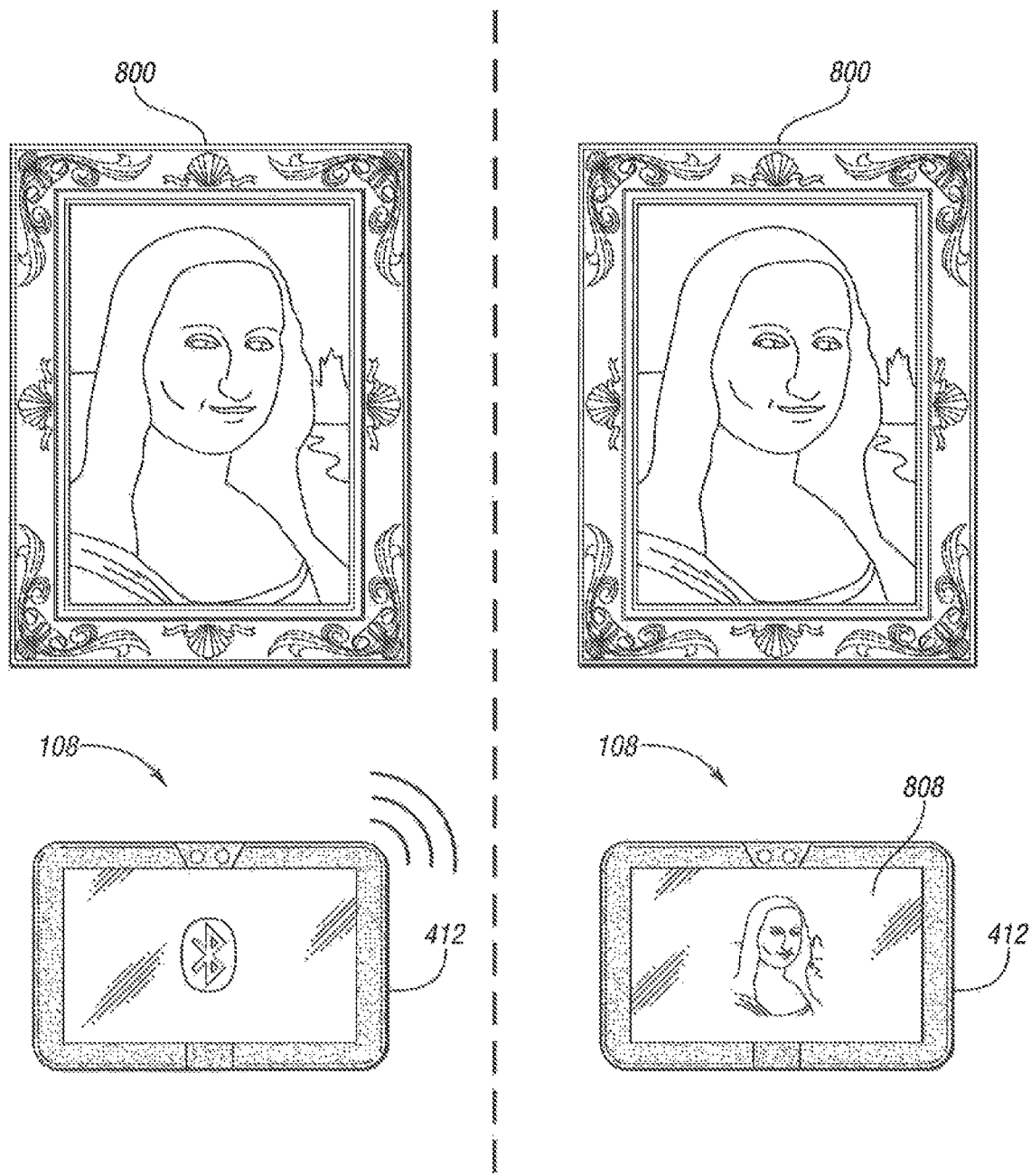
Figure 8B:
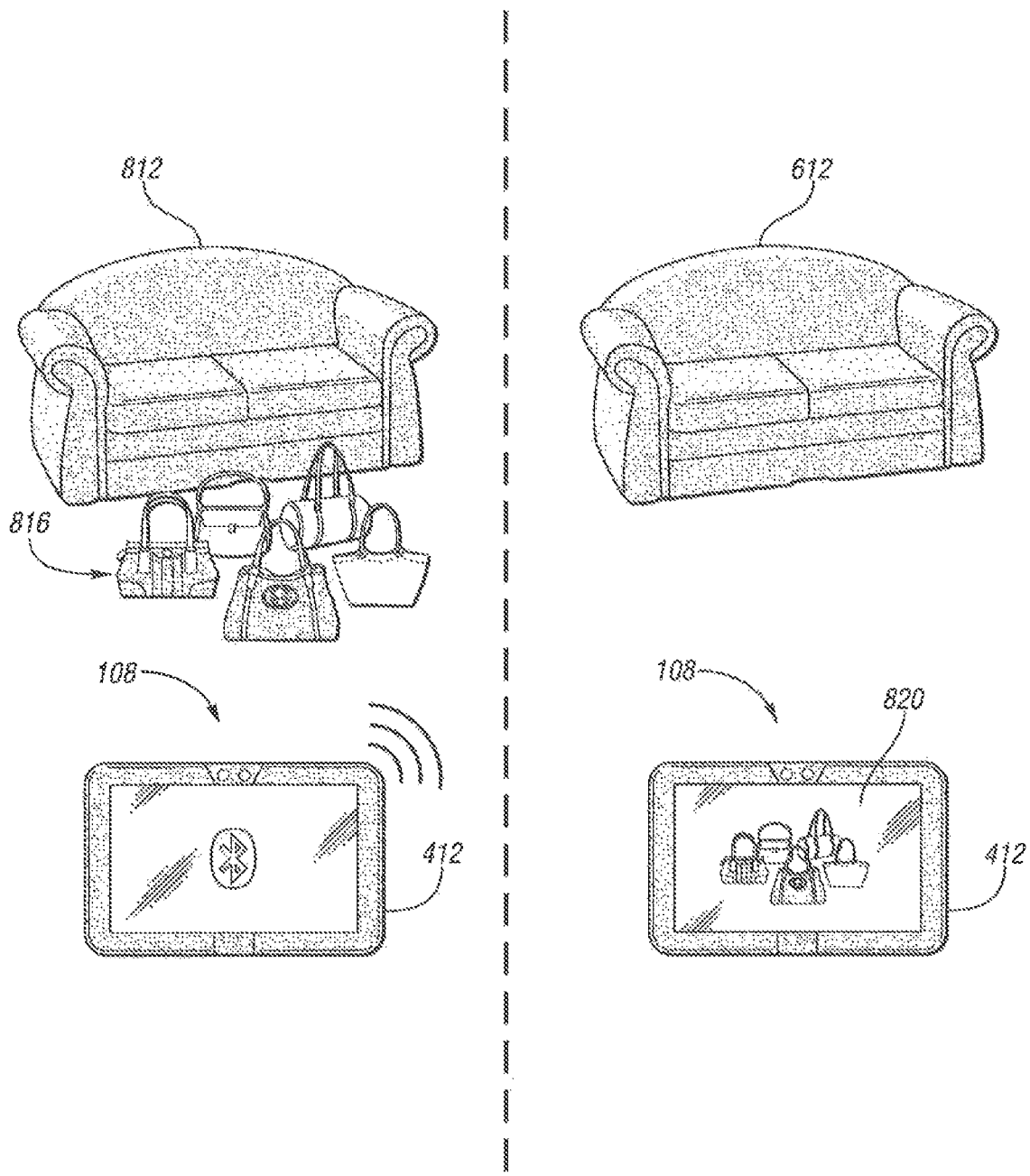
Figure 8C:
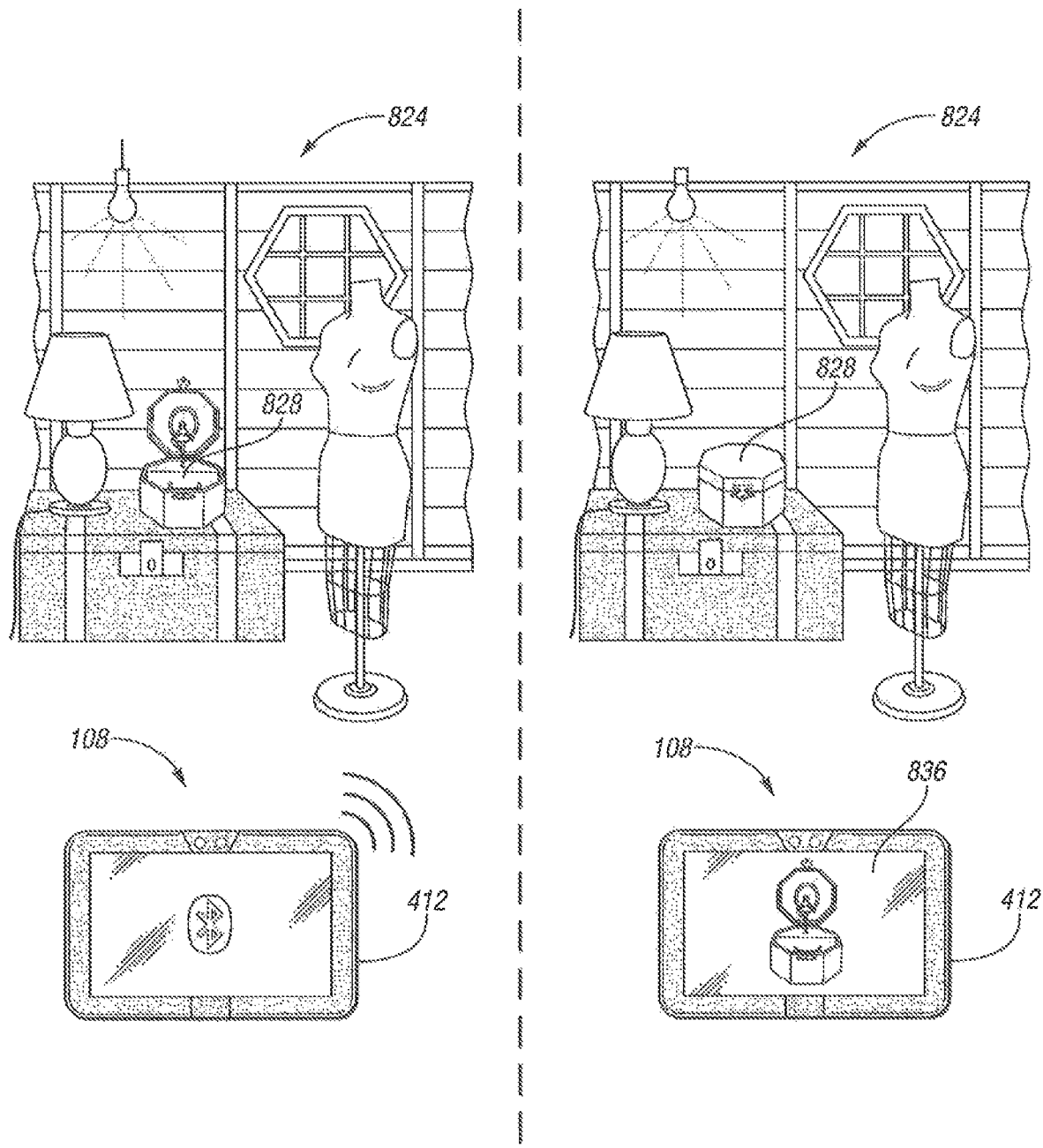

Rather than discrete physical tags 224, an object or scene may itself be a visual tag processed by a visual search engine or similar strategy to identify the object or scene and trigger an associated effect. For example, computer vision and image processing strategies may be used in combination with artificial intelligence strategies to identify an object or scene based on various associated characteristics, such as shapes, color content and positioning, and the like to identify the object or scene from an associated database by matching corresponding characteristics or statistics. An image or video of the hotel hallway 400 scene may be used to identify the hotel, the painting 404, and the distance of the user from the painting 404, for example. This information may be used in combination with various other location information, such as a local Wi-Fi connection, GPS coordinates, cellular tower ID, etc. to identify the user's position as well as the position of gaming or other objects in the vicinity of the user. The use of multiple sources of location or object identification generally improves the accuracy of the determination particularly where one or more sources of information may provide ambiguous information. For example, current civilian GPS coordinates become more ambiguous in urban areas where it may be difficult or impossible to obtain signals from more than one GPS satellite. Similarly, cellular signals often fade within elevators and certain buildings, for example, FIG. 5 is a block diagram illustrating operation of a system or method for interactive gaming using a wireless communication protocol, such as the Bluetooth protocol, for example according to various embodiments of the present disclosure. In this embodiment, one or more gaming devices 104 include an active tag that includes an associated Bluetooth device. Either or both of the active gaming device(s) 104 and hand-held mobile device 108 are programmed to listen for signals emanating from corresponding devices as generally represented by block 504. When the hand-held mobile device 108 is within a predetermined range, it may automatically pair with the gaming device(s) 104 by exchanging an identification or pairing code and authorization information. The pairing code and authorization information may be entered by the user and/or stored within hand-held device 108 with the gaming application as previously described. When the signal is received by the gaming device as represented by block 508, the gaming device 104 will communicate with the hand-held mobile device 108 by transmitting a signal. When the signal is received by the hand-held mobile device 108 as represented by block 516, the hand-held mobile device 108 will display gaming information as represented at 520. The gaming information could include playing a video and/or audio on the hand-held mobile device 108 as represented at 524 and 528, respectively. Alternatively, or in combination, the gaming device(s) 104 may perform a corresponding action.

The designated gaming area containing the gaming features that may be activated by appropriately programmed hand-held mobile multifunction devices may be as small as a room in a house or as large as a building, city, country or the world, depending on the particular implementation. As previously described, the type of tasks or goals for the game, the mobile device resources used to accomplish the goals, and the gaming devices may vary based on the size and/or location of the gaming area.

In one embodiment, as illustrated in FIG. 6, the system or method provide a brief introductory story or video 600 that plays on the multi-purpose/multi-function hand-held mobile communication/entertainment device 108 via a downloaded video, which may be obtained via a link to a third party provider, such as a You Tube video, for example. The link may include a password or other access code to provide private viewing access only to authorized players. Access codes may change periodically so that players cannot "cheat" by distributing the access codes or private links to complete the game without actually playing. The introduction video 600 may include various instructions and/or rules 604. For example, in one embodiment, the hand-held mobile device 108 uses a cellular or WiFi network to connect to an internet website and play a video 600 that instructs players to seek out a series of items 608. When a player locates an item, the item may be 1) activated with a touch of a button on the hand-held mobile device's 108 touchscreen or keyboard as represented by block 612, or 2) automatically activated when the hand-held mobile device 108 comes within range as represented by block 616. In the latter case, the hand-held device 108 may be paired using, the Bluetooth communications or other location or object identification information such as the visual representation of the scene or object, or a physical tag as previously described. Of course, other communications protocols and/or strategies may be used alone or in combination to detect proximity of the hand-held mobile device 108 to a designated game feature or object depending on the particular application and implementation and to play a media selection that is downloaded in response and/or previously installed and triggered by arriving at a particular location.

In another embodiment, as illustrated in FIGS. 7A-7C, the video instructs the player to seek out a jewelry box 700 in a small girl's room. The player searches for the room and when they find it, they enter and see the jewelry box 700 on a nightstand 704. The jewelry box 700 may open automatically to show the jewels inside when the player's hand-held mobile device 108, implemented here by a tablet computer 412, is within range. Alternatively, the hand-held mobile device 108 may be detected within range of the jewelry box 700 by automatically pairing with an associated feature communications device using Bluetooth or a similar short-range communications protocol. The handheld mobile device 108 then prompts the user to perform a location/context sensitive action to proceed. For example, the hand-held mobile device 108 may display an "open box" icon on the screen or request a secret password or spell. Upon performing the requested action, the hand-held mobile device 108 communicates associated information to the game feature (jewelry box 700 in this example) with the game feature responding accordingly, such as by opening the jewelry box 700, for example.

In contrast to various prior art implementations that use a central server in communication with various gaming features/devices, the hand-held mobile device 108 may be used to track most or all of the items the player has found so that certain rewards, videos or occurrences will happen only after the player has located a predetermined number of them, or has attained some other goal. For example, the player may have to find four jewelry boxes to earn a reward from the girl. The girl does this by appearing in a downloaded video, that may be obtained from an internet website, such as YouTube, for example, with the video being played by the hand-held mobile device 108 and appearing on the associated hand-held mobile device 108 screen.

In various embodiments, one or more objects or scenes may include visual or physical object tags that wirelessly connect the hand-held mobile device 108 to a website or other server to provide the associated effect to the user via the hand-held mobile device 108. For example, the user may use an integrated camera on the hand-held mobile device 108 to scan devices in the room. The jewelry box 700 may include a QR code that is processed by the hand-held mobile device 108 app to trigger an associated effect, such as an augmented reality (AR) video 716 that plays on the hand-held mobile device 108 and overlays the real-time view of the jewelry box 700 and surrounding elements. The AR video 716 may actually substitute a still image, animation, or full-motion video of a jewelry box 700 opening so that the actual jewelry box 700 appears to open when the user views the scene through the camera of the hand-held mobile device 108 although the actual jewelry box 700 remains closed.

Business Models

Gaming strategies according to various embodiments of the present disclosure may be used in a variety of contexts/applications. For example, the game can be configured for: 1) home use, 2) in an entertainment venue such as a theme park or other Family Entertainment Center/Complex (FEC), 3) a hotel/resort, 4) travel and sightseeing, 5) cruise ships, 6) museums, and any number of related venues.

In one embodiment, the interactive game is combined with one or more other types of entertainment games or activities within a location "center" dedicated for use with a smartphone, tablet computer, or other hand-held mobile device. For example, family entertainment centers may include traditional entertainment activities associated with arcades, mini-golf, go-karts, laser tag, bumper cars, etc. These traditional entertainment facilities are designed or upgraded to include mobile device interaction to create smartphone or mobile device entertainment centers, i.e. a place for visitors to take their personal hand-held mobile device and interact with all sorts of things as well as other people and their smartphones or other hand-held mobile devices. Mobile device interaction may include a wide variety of unique experiences that may be as simple as making a hand-held mobile device 108 interact with the mini-golf (a video plays at each hole telling a pirate story), or the go-karts (playing Mario Kart on the hand-held mobile device 108 powers up an associated real go kart to go faster or vice-versa). Activities may also include interactive or team building activities where groups of visitors are required to cooperate using their hand-held mobile devices to solve a mystery, complete a goal or task, etc.

Unlike prior art strategies, various embodiments of the present disclosure may be used to create entertainment centers specifically for mobile hand-held devices and applications, such as smartphone applications, of all kinds that can only be done live in a real-world environment.

Technical Architecture

The basic gaming application or app may be built as a template so that many different sites, locations, clients, themes and brands can be used in a "plug and play" fashion with the master app schema or architecture to create custom games for different locations, audiences, etc. Customized videos, graphics, games and components of many different types can be placed into the technical matrix or schema quickly and easily so the game can be configured for any of a number of business models and themes. Use of a template-type architecture according to embodiments of the present disclosure may reduce development costs while providing seemingly unique gaming experiences targeted to players of a particular age, genre, region, etc.

Haunted Attraction Embodiment

In one embodiment, as illustrated in FIGS. 8A-8D, an interactive game is played within a haunted attraction/adventure. The type of hand-held mobile device 108, implemented here by a tablet computer 412, used by the player may be automatically detected, and/or identified by the player, when installing the game. Installation enables the hand-held mobile device 108 to communicate with various game features. For example, installation may provide a game specific and/or player specific code or password used to detect proximity of the hand-held mobile device 108 to a particular game feature. In one embodiment, Bluetooth enabled devices may be provided with corresponding device identifications and pairing ID/passwords to automatically pair/connect with various game features when the hand-held mobile device 108 is within range. The following description/narrative demonstrates representative player actions, game features, and associated responses that will vary by application and implementation.

Game play begins with a video, text message, and/or phone call telling the player that this location has been haunted by the ghost of an old woman, such as previously described with reference to 600 of FIG. 6. To rid the place of her ghost, the player must find the six items that she covets from her past life, then four items that must be used in combination to send her spirit on to the otherworld so she may rest in peace. Along the way, the player will meet various other ghosts and characters who will help in the search and instruct the player how to send her spirit safely on.

Hand-held mobile device 108, implemented here by a tablet computer 412, has been enchanted with the ability to allow communication with spirits from the other world as well as locate and operate various haunted objects. Different spirit icons will appear on the screen that empower use of hand-held mobile device 108 in many new ways. The player begins with the ability to summon spirits from their pictures which can be used by pointing the tablet computer 412 at a picture and touching the icon on the screen, (pointing the hand-held mobile device 108 is meant to be symbolic only—no sensors, IR beams or other means are actually required other than the Bluetooth or similar communication features).

Players are then told to begin the journey by seeking out the portrait 800 of the ghost's sister who can tell them the first item she covets.

Not far away is a room themed as the sitting room m a mansion with various paintings of family members on the walls. Some are real paintings while others may be TV monitors framed to look like paintings with the family members in a freeze frame position that looks like a still painting, for example. These "paintings" have the ability to detect proximity and/or communicate with the hand-held mobile device 108 using Bluetooth communications or similar technology as previously described. The hand-held mobile device 108 then displays an associated message and/or icon when the device is within range and connects to the associated game feature. The player holds the hand-held mobile device 108 in their hand, points it at a painting, and touches the icon.

Depending on the particular application and implementation, all of the pictures may be real, i.e. no TV monitors used. In this representative example, a Bluetooth device or other tag on the painting will queue the hand-held mobile device 108 to play a video on the screen that may be loaded upon game installation and/or obtained from a local or wide area wireless network using a cellular and/or WiFi connection. For example, the hand-held mobile device 108 may connect to the internet and automatically access a public or private You Tube video that resembles the painting on the wall. This reduces the game development cost by reducing or eliminating the number of active game features, such as video monitors in this example.

Some paintings give no response at all as they are real and not part of the game, while other paintings may come alive (on the hand-held mobile device 108 or on a video monitor) and tell the player they have nothing to give them now.

One specific portrait of an old woman 800 comes alive with a 30 second video in which she tells the player that her sister coveted a jewelry box 828 that she had when she was little that played a haunting song when opened. However, for her to provide the location of the jewelry box 828 and the spirit power to open it, the player must first help by finding a red purse. Inside it they can find a note with a gentlemen's phone number on it that she likes very much. Return with that phone number and she will help them on their journey. As previously described with respect to the jewelry box 700 in FIGS. 7A-7C, an animation or video scene 808 displayed by the integrated camera of the hand-held mobile device 108 may be superimposed or overlaid using augmented reality techniques to give the appearance of the portrait of the old woman 800 coming alive rather than using an active object, such as a video or TV screen.

The player then searches and finds a red purse hidden among a pile of purses 816 located in front of a couch 812 and opens it manually. Inside is a note with the name John Smith on it and a phone number or text message number. The player must memorize or record this number as the note is securely attached inside the purse, i.e. the purse and note are props or passive gaming elements 104 and neither can be removed. As previously described, the pile of purses 816 and phone number could be displayed using the hand-held mobile device 108 with the image of the purses 820 and phone number overlaid or integrated into the video scene using augmented reality techniques to display a still image, animation, or video.

Returning to the portrait 800 and pressing the icon on the hand-held mobile device again summons the old lady back on screen Where she says, "Have you found the number? If so, key it in and send it over to me now." At this point the player uses the touchpad, keyboard, or voice recognition on his hand-held mobile device 108 to key in the correct number sequence. Once he does so, the lady in the portrait appears very happy and tells him that he can find the jewelry box 828 in the attic room 824 and provides the player with a new spirit power that can be used to open it. Depending on the particular implementation, the number may be intercepted by the app so that it does not actually send a message or otherwise use a cellular network to communicate. Rather, the app may use the Bluetooth or other short range communications protocol to communicate that the number has been successfully keyed into the hand-held mobile device 108. In other embodiments, an actual phone call or text message may be sent over the cellular network, or a message may be transmitted using TCP/IP over a cellular or WiFi connection to a remotely located game server or other central communications device monitoring game play.

In response to receiving the requested number or other information, a haunting tone emanates from the hand-held mobile device 108 and the new spirit power appears as an icon on the "spirit powers" screen of the hand-held mobile device 108.

Next, the player finds the attic room 824, goes inside and finds the jewelry box 828 sitting on a pedestal. Pointing the hand-held mobile device 108 at the box 828 and pressing the icon causes the jewelry box 828 to open whereby a tiny ballerina appears turning round and round as a haunting melody plays from the hand-held mobile device. As previously described, an animation or video 836 may be superimposed, overlaid, or may replace one or more objects from the real scene using augmented reality techniques to give the appearance of a tiny ballerina rather than an actual active object. Similarly, music may be provided by the object or associated audio device rather than hand-held mobile device 108. The old lady in the painting now appears on a video on the hand-held mobile device 108 and says "It looks like you have found her jewelry box 828. If you return this to my sister I'm sure she will be grateful." The jewelry box 828 now appears on the hand-held mobile device 108 screen on the players "inventory screen". Again, using augmented reality techniques, the jewelry box captured by the camera of the hand-held mobile device 108 may be digitally removed from the image displayed on the screen to simulate or emulate removing the jewelry box from the room.

Play continues like this as the player finds all of the items thru a combination of treasure hunting, puzzle solving and entering information into the hand-held mobile device.

For the game conclusion, once the player has found all of the items, they enter into the room where the ghost 844 lives and summon her with one of the powers they have earned by touching an associated icon on the screen. The ghost appears full size, hovering in air on a large screen projection 840 in front of them. The player must now touch all of the found or earned inventory items on hand-held mobile device 108 in the proper sequence to return the items and "exorcise" her spirit. During this time, the hand-held mobile device 108 may use a wireless communication protocol, such as Bluetooth to communicate to a corresponding device on a computer or DVD player associated with the game feature telling it which video sequence to play so that it appears seamless to the player. As previously described, an animation or video of the ghost 848 may be overlaid or integrated into the video scene using augmented reality techniques.

Various game sequences may be customized with various levels of customization depending on the particular application and implementation. For example, the player name may be incorporated into various audio and/or video game sequences. Similarly, players may be prompted to enter/identify various other information that may include text, graphics, images, videos, etc. that may be used to customize the game play. Likewise, various game sequences, instructions, puzzles, clues, etc. may be selected and/or customized based on the age of the player, a selected difficulty level, etc. For example, the final endgame sequence can be customized to be very easy for younger players or more difficult for older players.

Multiple Games Using a Single Mobile Device

In the haunted adventure embodiment described above, the gaming location could have a large number of interactive devices that work with the smart phone or other hand-held mobile device. The players could play a variety of games in the same location with the same devices with the devices reacting differently depending on the game that is being played on each player's mobile device as identified by the Bluetooth pairing, password, or other mobile device identification strategy. For example, in addition to the Haunted theme, other players could be simultaneously playing a western game, a science fiction game, a magical game, a zombie game, etc. Access to a particular gaming area or region may be selectively restricted to those players playing the same game theme at a particular time, particularly where the game features respond in a manner that may be viewed by more than one player. In embodiments where player interaction is limited to each user's mobile device, restricting access may not be advantageous.

As an example of other themes, when playing a western themed game, the old lady in the picture would appear in the video with a southern drawl in her voice and direct them where to find her husband's six shooters in the attic. For a science fiction themed game, the old lady would morph into a futuristic woman and direct them to find a ray gun in the attic. If it was a zombie themed game, the old lady would turn into a walking dead creature and tell them to find the silver bullets in the attic, etc.

The game features described for multiple game themes may be implemented using the same real props scattered around the attic or other gaming area, depending on the particular implementation. As such, multiple players could be playing different games on their handheld devices at the same time in the same space with the same props or gaming features, although various players may interpret the purpose or features differently based on the gaining context.

Similarly, different gaming contexts may be adapted to players by age, interest, or ability (easy, intermediate, advanced) and integrated with traditional games or entertainment activities that may include mini-golf, go-karts, laser tag, bumper cars, arcade games, carnival games, etc. As such, the gaining equipment or props are the same, but each user or groups of users are provided a unique interactive experience using their personal mobile device that may be customized on various levels depending on the particular application and implementation.

As demonstrated by the above features and embodiments, various embodiments according to the present disclosure provide associated advantages. For example, the mobile game design is based on live action gaming being played on a multipurpose, multi-function, hand-held device that the user already owns, such as a smart phone and/or entertainment device that may or may not have cellular, Wi-Fi, Bluetooth or other wireless networking or communications. Representative mobile devices may include a tablet computer such as the Apple iPad, Dell Streak or Inspiron Duo, and Samsung Galaxy Tab, for example; smart phones such as the Apple intone, Android phones by various manufacturers, Blackberry phones, and the like; and entertainment devices such as the Nintendo DS, Sony PSP, GP2X etc. The entire game itself may also be implemented as a mobile device application or app that resides within the mobile device after being downloaded/installed by the player using a normal downloading process for apps. In various embodiments, all of the videos for the game play directly on the mobile device such that no central server is required to monitor player progress to give out rewards, for example. In addition, because interactive gaming according to various embodiments of the present disclosure rely primarily on the mobile device resources rather than independent servers and numerous dedicated gaining devices, game construction costs may be substantially reduced, such as up to 90%, for example. Integration of a mobile device interactive experience with various forms of traditional entertainment may provide market differentiation to revitalize family entertainment centers and/or provide dedicated mobile device interactivity centers as a visitor destination. New activities, games, or interactive experiences can be created using a common platform or template to reduce development and deployment costs while providing unique player experiences.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A method for interactive gaming comprising:
providing a gaming object;
capturing an image using a mobile device having a camera;
processing the image for identification of at least a portion of the image;
manipulating the gaming object based at least in part on the identification of at least the portion of the image;
retrieving data based on the identification of at least the portion of the image; and
superimposing the data over at least a part of the image.

2. The method of claim 1 wherein the image is a static image.

3. The method of claim 1 wherein the image is a video image.

4. The method of claim 1 wherein identification of at least the portion of the image comprises identification of a tag.

5. The method of claim 4 wherein the tag is an active tag.

6. The method of claim 4 wherein the tag is a passive tag.

7. The method of claim 6 wherein the passive tag is a QR code, datamatrix, semacode, SPARQCode, barcode, ShotCode, High Capacity Color Barcode, or Aztec Code.

8. The method of claim 1 wherein the step of processing the image for identification comprises performing software image recognition on the image for identifying a physical object captured in the image.

9. A method of interaction comprising:
providing an object;
capturing an image using a mobile device having a camera;
processing the image for identification of at least a portion of the image;
manipulating the object based at least in part on the identification of at least the portion of the image;
retrieving data based on the identification of at least the portion of the image; and
superimposing the data over at least a part of the image.

10. The method of claim 9 wherein the image is a static image.

11. The method of claim 9 wherein the image is a video image.

12. The method of claim 9 wherein identification of at least the portion of the image comprises identification of a tag.

13. The method of claim 12 wherein the tag is an active tag.

14. The method of claim 12 wherein the tag is a passive tag.

15. The method of claim 14 wherein the passive tag is a QR code, datamatrix, semacode, SPARQCode, barcode, ShotCode, High Capacity Color Barcode, or Aztec Code.

16. The method of claim 9 wherein the step of processing the image for identification comprises performing software image recognition on the image for identifying a physical object captured in the image.

17. A method of interaction by a user comprising:
providing an object;
capturing an image using a mobile device having a camera;
processing the image for identification of at least a portion of the image;
triggering an action associated with the object based at least in part on the identification of at least the portion of the image;
retrieving data based on the identification of at least the portion of the image; and
superimposing the data over at least a part of the image.

18. The method of claim 17 wherein the image is a static image.

19. The method of claim 17 wherein the image is a video image.

20. The method of claim 17 wherein identification of at least the portion of the image comprises identification of a tag.

21. The method of claim 20 wherein the tag is an active tag.

22. The method of claim 20 wherein the tag is a passive tag.

23. The method of claim 22 wherein the passive tag is a QR code, datamatrix, semacode, SPARQCode, barcode, ShotCode, High Capacity Color Barcode, or Aztec Code.

24. The method of claim 17 wherein the step of processing the image for identification comprises performing software image recognition on the image for identifying a physical object captured in the image.

* * * * *